(12) United States Patent
Minamitani

(10) Patent No.: US 11,592,247 B2
(45) Date of Patent: Feb. 28, 2023

(54) HEAT EXCHANGER

(71) Applicant: SHOWA DENKO PACKAGING CO., LTD., Kanagawa (JP)

(72) Inventor: Koji Minamitani, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 0 days.

(21) Appl. No.: 16/456,178

(22) Filed: Jun. 28, 2019

(65) Prior Publication Data

US 2020/0003505 A1 Jan. 2, 2020

(30) Foreign Application Priority Data

Jun. 28, 2018 (JP) .............................. JP2018-122661

(51) Int. Cl.
*H01L 23/473* (2006.01)
*F28F 3/12* (2006.01)
(Continued)

(52) U.S. Cl.
CPC .............. *F28F 21/089* (2013.01); *F28F 1/40* (2013.01); *F28F 21/062* (2013.01)

(58) Field of Classification Search
CPC .... F28F 3/12; F28F 3/14; F28F 21/089; F28F 19/02; F28F 19/04; F28F 1/40;
(Continued)

(56) References Cited

U.S. PATENT DOCUMENTS 3,664,888 A * 5/1972 Oga .................. B05D 5/086
148/272
4,089,324 A * 5/1978 Tjaden .................. F28D 9/0062
126/666
(Continued)

FOREIGN PATENT DOCUMENTS

JP          2044189 A    2/1990
JP       2002-30499 A    1/2002
(Continued)

OTHER PUBLICATIONS

English Abstract of JP 2015-059693 A published Mar. 30, 2015.
(Continued)

*Primary Examiner* — Frantz F Jules
*Assistant Examiner* — Jason N Thompson
(74) *Attorney, Agent, or Firm* — Millen, White, Zelano & Branigan, PC; Ryan Pool

(57) ABSTRACT

A heat exchanger includes a bag-like outer packaging material. A heat medium flows into an inside of the outer packaging material. An inner core material is arranged in the inside of the outer packaging material. The outer packaging material has an outer packaging laminate material including a metal heat transfer layer and a resin thermal fusion layer on a surface side of the heat transfer layer. The outer packaging laminate materials form a bag shape by integrally joining the thermal fusion layers along the peripheral edge portions. The inner core material includes the inner core laminate material with a metal heat transfer layer and resin thermal fusion layers on surface sides of the heat transfer layer. The thermal fusion layers of a concave portion bottom and a convex portion top of the inner core material and the thermal fusion layers of the outer packaging laminate material are integrally joined.

11 Claims, 6 Drawing Sheets

(51) Int. Cl.
*F28F 3/14* (2006.01)
*F28F 19/02* (2006.01)
*F28F 19/04* (2006.01)
*F28F 19/06* (2006.01)
*F28F 21/08* (2006.01)
*F28F 1/40* (2006.01)
*F28F 21/06* (2006.01)

(58) Field of Classification Search
CPC ..... F28F 9/187; F28F 2255/08; H01L 23/473; H05K 7/20254
USPC .................................. 165/80.4, 133
See application file for complete search history.

(56) References Cited

U.S. PATENT DOCUMENTS

| | | | | |
|---|---|---|---|---|
| 4,407,358 | A * | 10/1983 | Muellejans | F28D 9/0062 165/166 |
| 5,203,402 | A * | 4/1993 | Nishishita | B05D 5/04 165/133 |
| 6,945,321 | B2 | 9/2005 | Hosoya et al. | |
| 2003/0164233 | A1* | 9/2003 | Wu | F28F 3/027 165/166 |
| 2006/0021745 | A1* | 2/2006 | Fritze | B29C 66/54 165/172 |
| 2007/0163768 | A1* | 7/2007 | Shinhama | F28F 3/025 165/183 |
| 2008/0283228 | A1* | 11/2008 | Ohwaki | F28F 19/04 165/151 |
| 2009/0071638 | A1* | 3/2009 | Murayama | F28F 3/025 29/890.03 |
| 2009/0114372 | A1* | 5/2009 | Ippoushi | F28F 3/12 165/104.14 |
| 2011/0271994 | A1* | 11/2011 | Gilley | F28D 7/0033 136/205 |
| 2013/0020060 | A1* | 1/2013 | Moser | F28D 1/05366 165/148 |
| 2015/0369545 | A1* | 12/2015 | Naritomi | F28F 3/12 165/76 |
| 2017/0194679 | A1* | 7/2017 | Chakraborty | F28F 3/12 |
| 2018/0259267 | A1* | 9/2018 | Tsai | F28D 9/0062 |

FOREIGN PATENT DOCUMENTS

| | | |
|---|---|---|
| JP | 2002243395 A | 8/2002 |
| JP | 2005-61690 A | 3/2005 |
| JP | 2008304123 A | 12/2008 |
| JP | 2015-59693 A | 3/2015 |
| JP | 2015-141002 A | 8/2015 |
| JP | 2016-189415 A | 11/2016 |
| WO | 13080611 A1 | 6/2013 |
| WO | 14112600 A1 | 7/2014 |

OTHER PUBLICATIONS

English Abstract of JP 2015-141002 A published Aug. 3, 2015.
English Abstract of JP 2016-189415 A published Nov. 4, 2016.
Notification of Reasons for Refusal in corresponding JP appln. 2018-122661 dated Jan. 18, 2022 (pp. 1-4) and english translation thereof (pp. 1-4).
Sumitomo : "Developed 'High-Functional Fluorine Coat' in which Abrasion Resistance of Fluororesin has been Drastically Enhanced" dated Jan. 30, 2012 by Sumitomo Electric Industries, Ltd. and Sumitomo Electric Fine Polymer, Inc. (pp. 1-6) (See figures and partial translation of relevant section (1 page)).

* cited by examiner

HEAT EXCHANGER

TECHNICAL FIELD

The present invention relates to a heat exchanger produced using a laminate material such as a laminated sheet in which a resin layer is laminated on a metal layer.

BACKGROUND ART

With miniaturization and high performance of electronic equipment such as smartphones and personal computers, it has become important to take measures against heat generation around a CPU of the electronic equipment. Under the circumstances, in some models, a technique of avoiding adverse effects of heat has been conventionally proposed, in which water cooling type cooling devices and/or heat pipes are incorporated to reduce the heat load for electronic components such as CPU etc. and avoid trapping of heat in the case.

A battery module mounted on electric vehicles or hybrid vehicles generates a large amount of heat from the battery pack because it repeatedly performs charging and discharging. For this reason, even in a battery module, in the same manner as the above-mentioned electronic equipment, a technique of avoiding adverse effects of heat has been proposed, in which water cooling type cooling devices and/or heat pipes are incorporated to avoid adverse effects of heat.

Furthermore, even in a power module made of silicon carbide (SiC), etc., as a measure against heat generation, a measure, such as mounting a cooling plate or a heat sink, has been proposed.

By the way, a case for electronic equipment, such as the above-mentioned smartphones and personal computers, is thin, and many electronic components and cooling devices are incorporated in a limited space in the thin case. For this reason, as the cooling device itself, a thin cooling device is used.

Conventionally, in general, a thin type cooling device, such as a heat pipe, to be incorporated in a small-sized electronic equipment, has been produced by joining a plurality of metal machined parts obtained by processing metal such as aluminum having high heat transfer property with brazing, diffusion bonding, etc. (see, e.g., Patent Documents 1 to 3).

PRIOR ART

Patent Document

Patent Document 1: Japanese Unexamined Patent Application Publication No. 2015-59693
Patent Document 2: Japanese Unexamined Patent Application Publication No. 2015-141002
Patent Document 3: Japanese Unexamined Patent Application Publication No. 2016-189415

SUMMARY OF THE INVENTION

Problems to be Solved by the Invention

In the above-described conventional small-sized electronic equipment cooling device, each constituent part is produced by plastic working such as casting or forging, or metal working (mechanical working) such as removal processing including, e.g., cutting. Since such metal working is troublesome and severe in restrictions, there is a limit to achieve thinning, and there is a problem that it is difficult to achieve thinning further more.

A conventional small-sized electronic equipment cooling device is required to be produced using metal working (metal-to-metal joining) with high difficulty, such as, e.g., brazing or diffusion bonding, when joining components. Thus, there are problems that the production is difficult, lowering the production efficiency, which in turn increases the cost.

Furthermore, a conventional cooling device is produced using restrictive metal working, so the shape and size cannot be easily changed. Therefore, there is also a problem that the degree of freedom in design is poor and it lacks versatility.

The disclosed embodiments of this disclosure have been developed in view of the above-mentioned and/or other problems in the related art. The disclosed embodiments of this disclosure can significantly improve upon existing methods and/or apparatuses.

The present invention has been made in view of the above-mentioned problems. The purpose of the present invention is to provide a heat exchanger capable of achieving sufficient thinning, high design freedom, excellent versatility, efficient and easy production, and cost reduction.

The other purposes and advantages of some embodiments of the present invention will be made apparent from the following preferred embodiments.

Means for Solving the Problems

In order to solve the aforementioned problems, the present invention provides the following means.

[1] A heat exchanger comprising:
a bag-like outer packaging material provided with a heat medium inlet and a heat medium outlet, wherein a heat medium flows into an inner space of the outer packaging material via the heat medium inlet, flows through the inner space, and flows out of the outer packaging material via the heat medium outlet; and
an inner core material arranged in the inner space of the outer packaging material,
wherein the outer packaging material is constituted by an outer packaging laminate material including a metal heat transfer layer and a resin thermal fusion layer provided on one surface side of the heat transfer layer, and the outer packaging laminate materials are stacked one on the other and the thermal fusion layers of the outer packaging laminate materials are integrally joined to each other along a peripheral edge portion of the outer packaging laminate material,
wherein the inner core material is constituted by an inner core laminate material including a metal heat transfer layer and resin thermal fusion layers provided on both surface sides of the heat transfer layer, and includes concave and convex portions, and
wherein the thermal fusion layers of a concave portion bottom and a convex portion top of the inner core material and the thermal fusion layers of the outer packaging materials are integrally joined.

[2] The heat exchanger as recited in the aforementioned Item [1],
wherein the thermal fusion layer of the outer packaging material and the thermal fusion layer of the inner core material are made of the same kind of resin.

[3] The heat exchanger as recited in the aforementioned Item [1] or [2], wherein a depth of the concave portion or a height of the convex portion is set to 0.1 mm to 50 mm.

[4] The heat exchanger as recited in any one of the aforementioned Items [1] to [3],
further comprising joint pipes,
wherein one of the joint pipes is provided at the heat medium inlet and the other of the joint pipes is provided at the heat medium outlet, and the joint pipes are configured to allow the heat medium to flow into and flow out of the outer packaging material via the joint pipes.

[5] The heat exchanger as recited in the aforementioned Item [4],
wherein each of the join pipes is provided with a resin thermal fusion layer on an outer peripheral surface of each of the joint pipes,
wherein the outer packaging laminate materials are stacked one on the other via the joint pipes, the thermal fusion layers of the outer packaging laminate materials are integrally joined to the thermal fusion layers of the joint pipes, and the joint pipes are attached to the outer packaging material in a sealed state, and
wherein the thermal fusion layer of the outer packaging laminate material and the thermal fusion layer of each of the joint pipes are made of the same kind of resin.

[6] A method of producing the heat exchanger as recited in any one of the aforementioned Items [1] to [5],
wherein the concave and convex portions of the inner core material are formed by an embossing process or a corrugating process.

[7] The method of producing the heat exchanger as recited in the aforementioned Item [6],
wherein the concave and convex portions are formed on the inner core material by passing the inner core laminate material between a pair of embossing rolls or a pair of corrugating rolls while sandwiching the inner core laminate material between the pair of embossing rolls or the pair of corrugating rolls.

[8] The method of producing the heat exchanger as recited in any one of the aforementioned Items [1] to [5],
wherein the concave and convex portions of the inner core material are formed by a pleating process.

Effects of the Invention

According to the heat exchanger of the present invention as recited in the aforementioned Item [1], the heat exchanger is produced by thermally fusing the laminate materials each having the thermal fusion layer. Therefore, there is no need to use troublesome metal working, enabling efficient and easy production, which in turn can achieve the cost reduction. Furthermore, since the production can be completed by bonding the laminate materials, it is possible to achieve corrosion resistance and sufficient thinning. Furthermore, in the heat exchanger of the present invention, the laminate material as the outer packaging material and the inner core material can be easily changed in shape and size, so the degree of freedom in design can be increased and versatility can be improved.

According to the heat exchanger of the invention as recited in the aforementioned Item [2], the outer packaging material and the inner core material can be integrally joined together more assuredly, which can improve the pressure resistance.

According to the heat exchanger of the invention as recited in the aforementioned Item [3], the flow passage for the heat medium can be assuredly formed inside the outer packaging material.

According to the heat exchanger of the invention as recited in the aforementioned Item [4], since the heat medium can be flowed into and out of the inner space of the outer packaging material via the joint pipes, it is possible to suppress the heat medium from leaking through the junction of the flow passage.

According to the heat exchanger of the invention as recited in the aforementioned Item [5], the joint pipes can be attached to the outer packaging material in a state in which the joint pipes are sealed more assuredly.

According to the method of producing the heat exchanger of the invention as recited in the aforementioned Items [6] to [8], the heat exchanger of the inventions as recited in the aforementioned Items [1] to [5] can be produced efficiently and assuredly.

BRIEF DESCRIPTION OF THE DRAWINGS

Some preferred embodiments of the present invention are shown by way of example, and not limitation, in the accompanying figures.

FIG. 1A to FIG. 1C are views showing a heat exchanger which is an embodiment of the present invention, wherein FIG. 1A is a plan view, FIG. 1B is a side cross-sectional view taken along the line B-B in FIG. 1A, and FIG. 1C is a front cross-sectional view taken along the line C-C in FIG. 1A.

FIG. 5A and FIG. 5B are views for explaining the production procedure of the heat exchanger of the embodiment, wherein FIG. 5A is a front cross-sectional view thereof, and FIG. 5B is a top view thereof.

FIG. 5C and FIG. 5D are views for explaining the production procedure of the heat exchanger of the embodiment, wherein FIG. 5C is a front cross-sectional view thereof, and FIG. 5D is a top view thereof.

FIG. 5E and FIG. 5F are views for explaining the production procedure of the heat exchanger of the embodiment, wherein FIG. 5E is a front cross-sectional view thereof, and FIG. 5F is a top view thereof.

FIG. 5G and FIG. 5H are views for explaining the production procedure of the heat exchanger of the embodiment, wherein FIG. 5G is a front cross-sectional view thereof, and FIG. 5H is a top view thereof.

EMBODIMENTS FOR CARRYING OUT THE INVENTION

In the following paragraphs, some preferred embodiments of the invention will be described by way of example and not limitation. It should be understood based on this disclosure that various other modifications can be made by those in the art based on these illustrated embodiments.

Figure 1A:
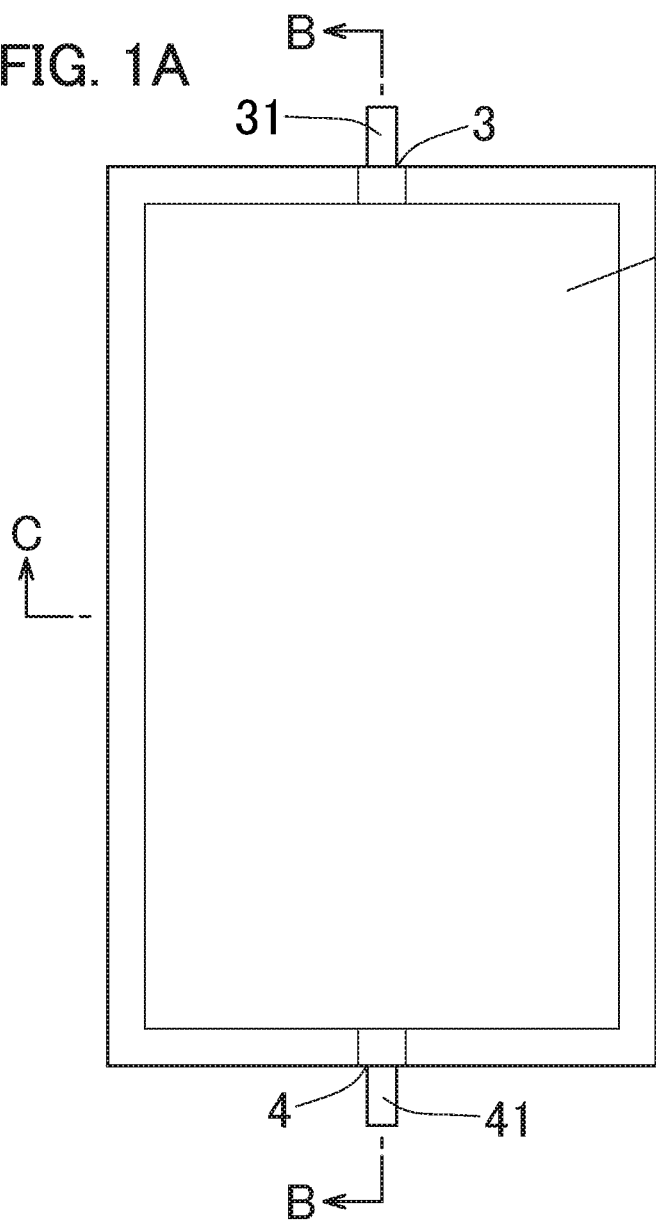
Figure 1B:
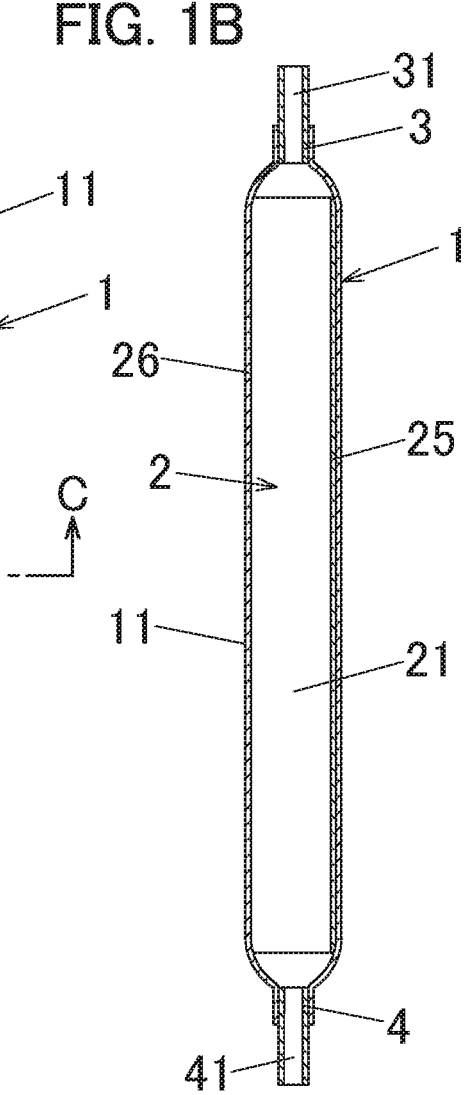
Figure 1C:
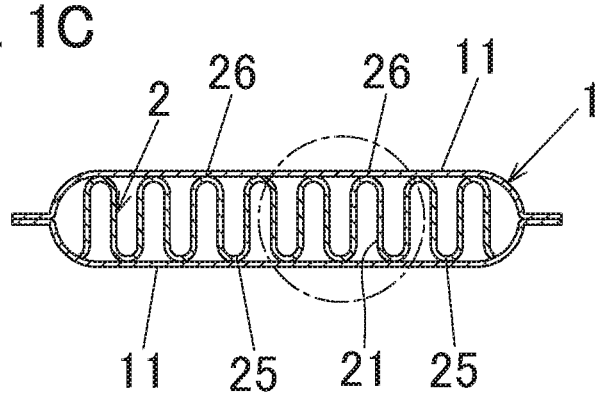
Figure 2:
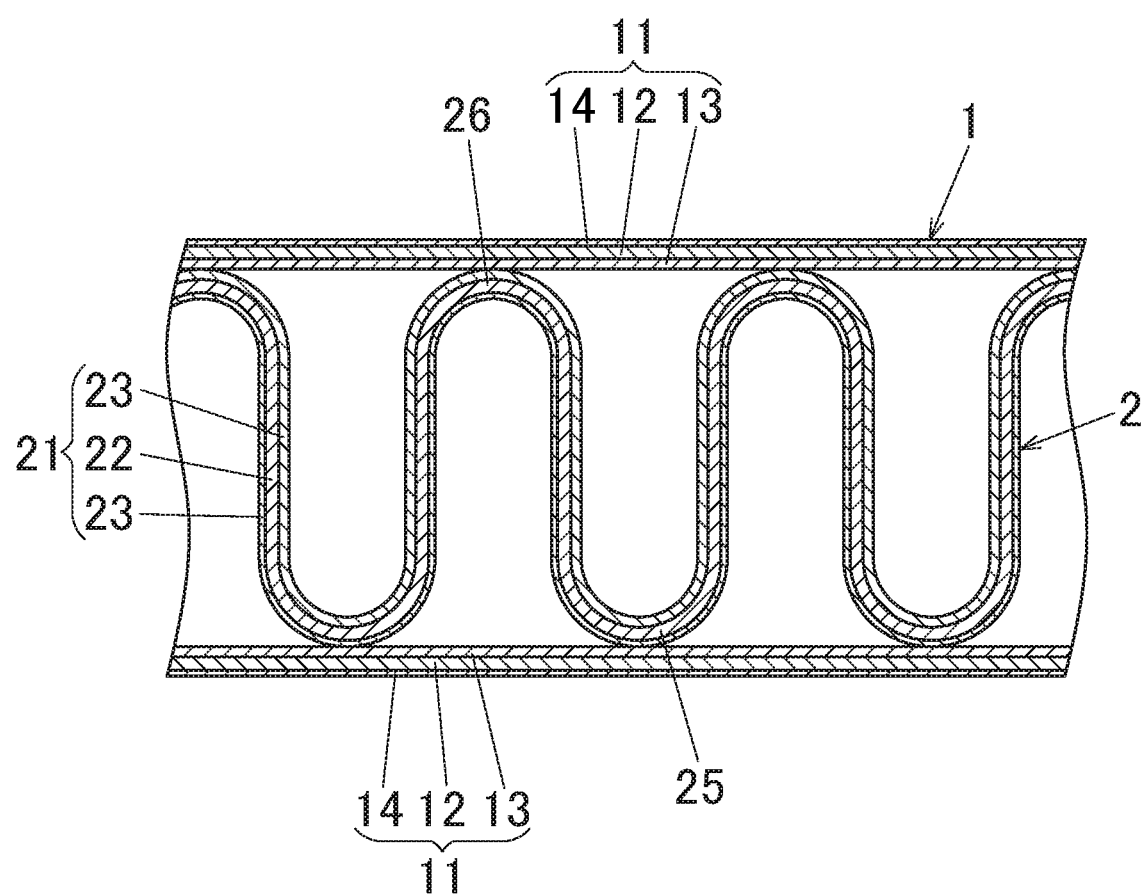
FIG. 2 is an enlarged cross-sectional view showing the portion surrounded by the alternate long and short dash line in FIG. 1C.

FIG. 1A to FIG. 1C are views showing a heat exchanger according to an embodiment of the present invention, and FIG. 2 is an enlarged cross-sectional view showing the portion surrounded by the alternate long and short dash line in FIG. 1C.

In the heat exchanger of this embodiment, in order to facilitate understanding of the invention, the following description will be made in which the up and down direction in FIG. 1A is referred to as the "front and rear direction" and the left and right direction is referred to as the "left and right direction", and the up and down direction in FIG. 1C is referred to as the "up and down direction (thickness direction)".

Note that since the heat exchanger of this embodiment is formed in a symmetrical shape in any of the front and rear direction, the left and right direction, and the up and down direction, the same configuration is obtained regardless of which of the front and rear direction, the left and right direction, and the up and down direction is replaced.

As shown in FIG. 1A to FIG. 2, the heat exchanger of this embodiment is provided with a bag-like outer packaging material 1 and an inner core material 2 arranged in an inner space of the outer packaging material 1, and a refrigerant inlet (heat medium inlet) 3 and a refrigerant outlet (heat medium outlet) 4 are provided at the front end portion and the rear end portion of the outer packaging material 1, respectively.

The outer packaging material 1 is composed of an outer packaging laminate material 11 as a laminate material such as a laminated sheet. As shown in FIG. 2, the outer packaging laminate material 11 is provided with a metal heat transfer layer 12, a resin thermal fusion layer 13 laminated on one surface (inner surface) of the heat transfer layer 12, a resin coating layer 14 laminated on the other surface (outer surface) of the heat transfer layer 12. The outer packaging material 1 of this embodiment is formed in a bag shape by stacking two outer packaging laminate materials 11 formed in a rectangular shape which will be described later one on top of the other and integrally joining the thermal fusion layers 13 of the outer peripheral edge portions of the outer packaging laminate materials 11 by thermal fusing (heat sealing).

Joint pipes 31 and 41 are attached to the refrigerant inlet 3 and the refrigerant outlet 4 of the outer packaging material 1. In this embodiment, the joint pipes 31 and 41 are configured by, for example, an integrally molded article of synthetic resin, and at least the surface resin thereof is served as a thermal fusion layer.

The joint pipes 31 and 41 are arranged between the front end portions and between the rear end portions of the two outer packaging laminate materials 11 constituting the outer packaging material 1 so as to be sandwiched therebetween, and the outer peripheral surface (thermal fusion layer) of each of the joint pipes 31 and 41 is integrally joined to the thermal fusion layer 13 of the corresponding outer packaging laminate material 11 by thermal fusion. With this, the joint pipes 31 and 41 are fixed to the outer packaging material 1 at the positions of the refrigerant inlet 3 and the refrigerant outlet 4 of the outer packaging material 1 in a state in which the joint pipes 31 and 41 penetrate the front end portion and the rear end portion of the outer packaging material 1. In this state, the entire outer peripheral surface of the joint pipe 31, 41 and the thermal fusion layers 13 of the outer packaging laminate materials 11 are sealed by thermal fusion.

Furthermore, one end side of each joint pipe 31, 41 is arranged outside the outer packaging material 1, and the other end side thereof is arranged inside the outer packaging material 1. Thus, the refrigerant can be introduced to the inside of the outer packaging material 1 via the joint pipe 31 on the refrigerant inlet 3 side, and the refrigerant inside the outer packaging material 1 can be derived outside via the joint pipe 41 on the refrigerant outlet 4 side.

Here, in this embodiment, the heat transfer layer 12 in the outer packaging laminate material 11 is made of a metal film (metal foil). Specifically, as a metal film of the heat transfer layer 12, an aluminum foil, a stainless steel foil, a nickel foil or a plated copper foil, and a clad metal of a nickel foil and a copper foil can be used suitably. In particular, it is more preferable to use an aluminum foil in consideration of thermal conductivity, cost, and the like.

Further, as the heat transfer layer 12, a heat transfer layer having a thickness of 8 μm to 300 μm, more preferably 8 μm to 100 μm, can be suitably used.

In addition, by applying a surface treatment such as a chemical conversion treatment, the heat transfer layer 12 can be further improved in durability, such as the corrosion prevention of the heat transfer layer 12 and the improvement of adhesive property of the heat transfer layer 12 with resin.

The chemical conversion treatment is performed by, for example, the following processing. That is, a chemical conversion treatment is performed by coating one of the following aqueous solutions 1) to 3) on the surface of the metal foil subjected to a degreasing treatment, followed by drying.

1) an aqueous solution of a mixture containing a phosphoric acid, a chromic acid, and at least one compound selected from the group consisting of a metal salt of a fluoride and a non-metal salt of a fluoride 2) an aqueous solution of a mixture containing a phosphoric acid, at least one resin selected from the group consisting of an acryl based resin, a chitosan derivative resin, and a phenol based resin, and at least one compound selected from the group consisting of a chromic acid and a chromium (III) salt 3) an aqueous solution of a mixture containing a phosphoric acid, at least one resin selected from the group consisting of an acryl based resin, a chitosan derivative resin, and a phenol based resin; at least one compound selected from the group consisting of a chromic acid and a chromium (III) salt; and at least one compound selected from the group consisting of a metal salt of a fluoride and a non-metal salt of a fluoride In the above-described chemical conversion coating film, the chromium adhesion amount (per one surface) is preferably set to 0.1 mg/m$^2$ to 50 mg/m$^2$, more preferably 2 mg/m$^2$ to 20 mg/m$^2$.

This surface treatment is the same as in the heat transfer layer 22 of the inner core laminate material 21 which will be described later.

As the thermal fusion layer 13, a resin film can be used suitably. As a resin film of the thermal fusion layer 13, specifically, a resin film having a heat fusibility, such as, e.g., a polyolefin based resin, such as, e.g., polyethylene and polypropylene (for example, non-stretched polypropylene) or a modified resin thereof, a polyester based resin, such as, e.g., a fluorine based resin and a PET resin, and a vinyl chloride resin is preferably used.

As the thermal fusion layer 13, a thermal fusion layer having a thickness of 20 μm to 5,000 μm, more preferably 20 μm to 1,000 μm, can be suitably used.

Note that the coating layer 14 is not always required. However, by laminating the coating layer 14, it is possible to give effects as a protective layer, such as, e.g., corrosion-resistant prevention, prevention of leakage (damage) due to external pressure and internal pressure, to the metal heat transfer layer 12 of the heat exchanger. In addition, by using an insulating resin for the coating layer 14, it is possible to give an insulation effect, such as, e.g., short circuit prevention and leakage prevention, to a device as a heat exchange target. On the other hand, by using a conductive resin for the coating layer 14, it is possible to give an antistatic effect to the device as a heat exchange target. As the coating layer 14, a resin film similar to the thermal fusion layer 13 can be suitably used.

In this embodiment, the coating layer 14 may be the same as or different from the thermal fusion layer 13 described above. Note that, considering that the outer packaging material 1 and the inner core material 2 are thermally bonded, it is preferable to use the coating layer 14 having a melting point higher than that of the thermal fusion layer 13. In particular, it is more preferable to use a resin having a melting point higher than that of the thermal fusion layer 13 by 10° C. or more.

Further note that the thickness of the coating layer 14 is not particularly limited, but is preferably set to the same or smaller thickness as the thermal fusion layer 13 described above.

In this embodiment, the outer packaging laminate material 11 is produced by bonding a resin film for the thermal fusion layer 13 to one surface (inner surface) of a metal film for the heat transfer layer 12 by an adhesive agent and bonding a resin film for the coating layer 14 on the other surface (outer surface) of the metal film for the heat transfer layer 12 by an adhesive agent. The outer packaging laminate material 11 can be produced using a known laminating method.

Further note that, in the outer packaging laminate material 11 of this embodiment, the adhesive agent for bonding the layers 12, 13 and 14 is not particularly limited, but, for example, a urethane based adhesive agent can be suitably used.

In this embodiment, each joint pipe 31, 41 is formed of an integrally molded article of hard synthetic resin. Considering the heat fusibility with the outer packaging laminate material 11, the joint pipe 31, 41 is preferably produced by using a resin of the same kind as the thermal fusion layer 13 of the outer packaging laminate material 11.

On the other hand, the inner core material 2 is composed of an inner core laminate material 21 as a laminate material, such as a laminated sheet, in the same manner as the outer packaging material 1. This inner core laminate material 21 is composed of a metal heat transfer layer 22 and resin thermal fusion layers 23 laminated on both surfaces of the heat transfer layer 22.

In this embodiment, the heat transfer layer 22 of the inner core laminate material 21 may preferably be the same as the heat transfer layer 12 of the outer packaging laminate material 11 described above. In this embodiment, the heat transfer layer 22 of the inner core laminate material 21 may be the same as or different from the heat transfer layer 12 of the outer packaging laminate material 11.

The thermal fusion layer 23 of the inner core laminate material 21 may be preferably the same as the thermal fusion layer 13 of the outer packaging laminate material 11. In this embodiment, considering the heat fusibility, the thermal fusion layer 23 of the inner core laminate material 21 and the thermal fusion layer 13 of the outer packaging laminate material 11 are preferably the same kind of material.

In this embodiment, the inner core laminate material 21 is produced by bonding a resin film for the thermal fusion layer 23 on both surfaces of a metal film for the heat transfer layer 22 with an adhesive agent. The inner core laminate material 21 may be produced using a known laminating method.

Further note that, in the inner core laminate material 21 of this embodiment, the adhesive agent for bonding the layers 22, 23 and 23 is not particularly limited, but, for example, a urethane based adhesive agent can be suitably used.

Figure 3A:
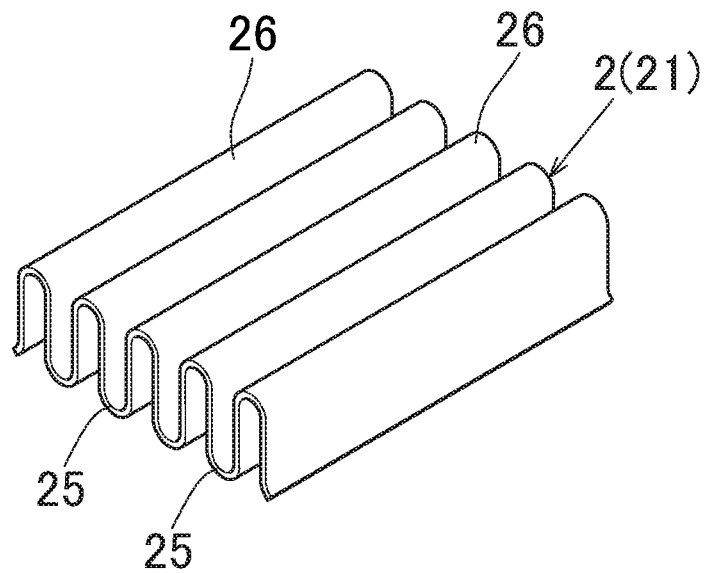
FIG. 3A is a perspective view showing an example of the inner core material in the heat exchanger of the embodiment.

In this embodiment, as shown in FIG. 3A, the inner core laminate material 21 is subjected to a corrugating process to be formed in a corrugated plate shape, and is configured as the inner core material 2. The portion of the corrugated inner core material 2 which is protruded (depressed) toward one surface side (lower side) is configured as a concave portion 25 and a portion of the corrugated inner material which is protruded toward the other surface (upper side) is configured as a convex portion 26.

Figure 4:
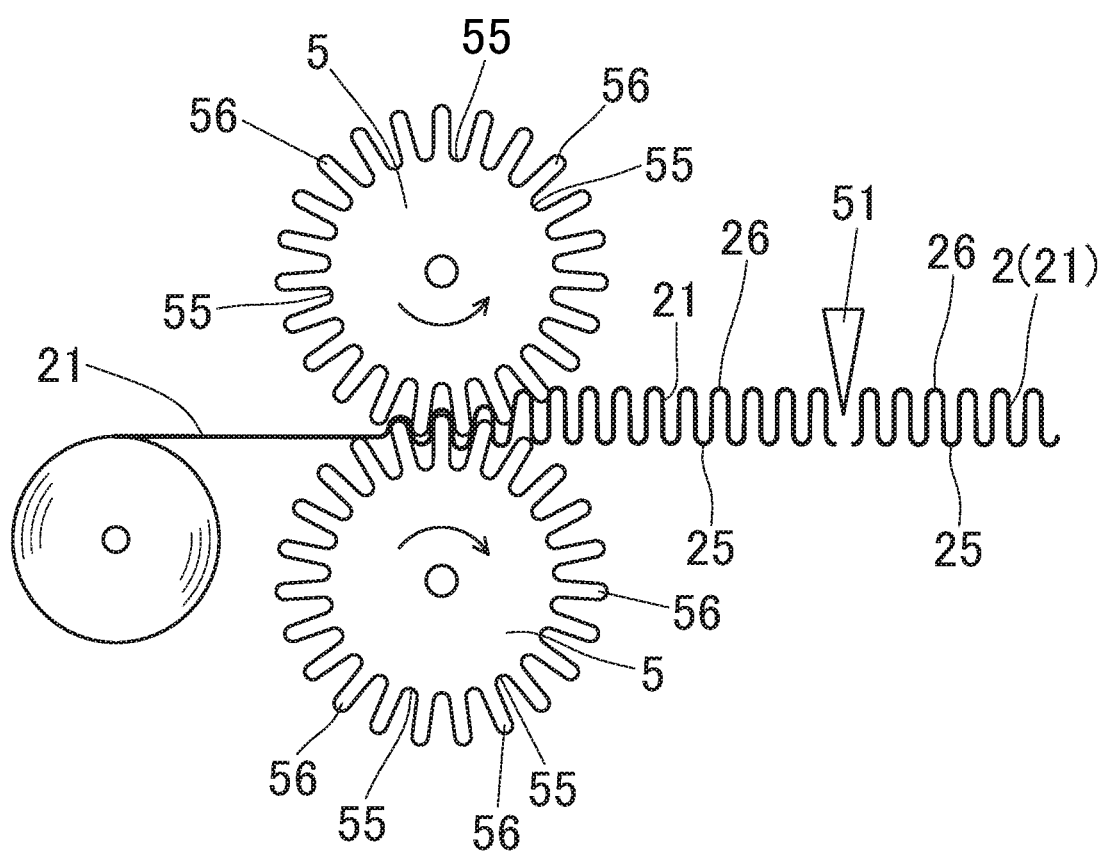
FIG. 4 is a side view for explaining the processing method of the inner core material of the embodiment.

In this embodiment, the corrugating process is performed using a pair of corrugating rolls 5 as shown in FIG. 4. Each corrugating roll 5 is provided with a concave portion 55 and a convex portion 56 alternately arranged in the rotation direction on the outer peripheral surface of the corrugating roll 5. Each concave portion 55 of one of the corrugating rolls 5 corresponds to each convex portion 56 of the other of the corrugating rolls 5. Each convex portion 56 of one of the corrugating rolls 5 corresponds to each concave portion 55 of the other of the corrugating rolls 5. The pair of corrugating rolls 5 are configured so that the respective concave and convex portions 55 and 56 are engaged with each other.

Then, by rotating the pair of corrugating rolls 5 in a state in which the inner core laminate material 21 is sandwiched between the pair of corrugating rolls 5, the inner core laminate material 21 is passed through between the pair of corrugating rolls 5 to be formed in a corrugated sheet shape. Furthermore, the corrugated inner core laminate material 21 is cut into a predetermined length by a shear knife (shear cutting blade) 51 arranged on the downstream side of the corrugating rolls 5. Thus, the inner core material 2 is produced.

As described above, the inner core material 2 configured as described above is accommodated inside the outer packaging material 1. The thermal fusion layer 23 at the bottom of the concave portion 55 of the inner core material 2 is integrally joined by thermal fusion to the thermal fusion layer 13 of the lower outer packaging laminate material 11 of the outer packaging material 1. While, the thermal fusion layer 23 at the top of the convex portion 26 of the inner core material 2 is integrally joined by thermal fusion to the thermal fusion layer 13 of the upper outer packaging laminate material 11 of the outer packaging material 1.

In this embodiment, the wave direction of the corrugated inner core laminate material 21 is arranged corresponding to the left and right direction of the heat exchanger (left and right direction in FIG. 1A).

Figure 3B:
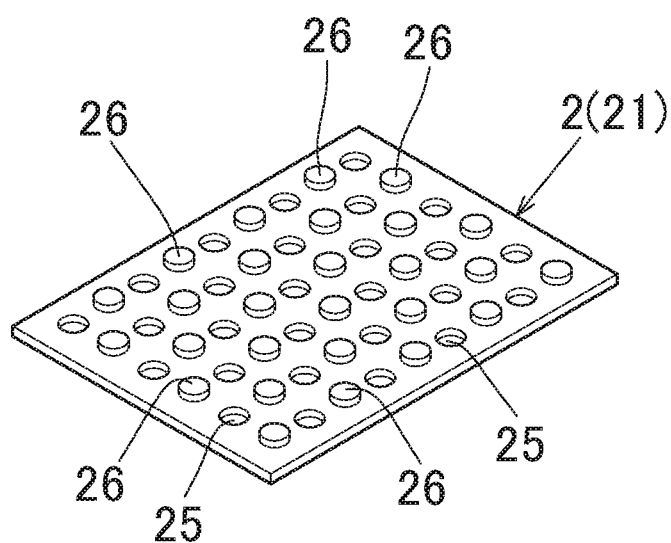
FIG. 3B is a perspective view showing another example of the inner core material in the heat exchanger of the embodiment.

In this embodiment, the inner core material 2 is formed in a corrugated shape to form concave and convex portions 25 and 26, but the invention is not limited thereto. In the present invention, as shown in FIG. 3B, a plurality of concave portions 25 and a plurality of convex portions 26 may be dispersedly formed by embossing in a staggered pattern or the like so that the concave portion 25 and the convex portion 26 are alternately arranged in the front and rear direction and in the left and right direction in the inner core material 2.

This embossing can be performed using a pair of embossing rolls. For example, as the embossing roll, an embossing roll formed so that a concave portion and a convex portion are alternately arranged in the rotation direction and in the axial direction on the outer peripheral surface may be used. Furthermore, a pair of embossing rolls is arranged so that the respective concave and convex portions are engaged with each other in a state in which each concave portion of one of the pair of embossing rolls corresponds to each convex portion of the other of the pair of embossing rolls and each convex portion of one of the pair of embossing rolls corresponds to each concave portion of the other of the pair of embossing rolls. Then, by rotating the pair of embossing rolls in a state in which the inner core laminate material 21 is sandwiched between the pair of embossing rolls, the inner core laminate material 21 is passed through between the pair of embossing rolls to be formed in a wave sheet shape. With this, the inner core material 2 as shown in FIG. 3B in which concave portions 25 and convex portions 26 are dispersedly formed in the staggered pattern or the like can be produced.

It should be noted that in the present invention, the shape of the concave portion 25 and the shape of the convex portion 26 are not particularly limited. Each of the concave portion 25 and the convex portion 26 may be formed in a circular shape, an elliptical shape, or an oval shape, or may be formed in a polygonal shape, such as, e.g., a triangle, a quadrangle, and a pentagon, or may be formed in an irregular shape. Furthermore, it may be formed in a combined shape of the aforementioned shapes, such as, e.g., a diamond pattern, a silk pattern, a cloth pattern, a satin pattern, a water ball pattern, a comb pattern, and a streak pattern.

It should further be noted that the arrangement pattern of the plurality of concave and convex portions is not particularly limited, and may be arranged in any manner. It also should be noted that the arrangement does not necessarily have to be regular, and a plurality of concave and convex portions may be randomly arranged.

Further, in this embodiment, the inner core material 2 is formed in a corrugated plate shape by a corrugating process, but the present invention is not limited thereto. In the present invention, the inner core material 2 may be formed in a corrugated shape by a pleating process.

In this embodiment, it is preferable to set the depth of the concave portion 25 or the height of the convex portion 26 of the inner core material 2 to 0.1 mm to 50 mm. That is, by adjusting the depth or the height of the concave and convex portions 25 and 26 so as to fall within the aforementioned range, the refrigerant flow path formed inside the outer packaging material 1 can be formed assuredly, and favorable flow characteristics can be acquired.

In this embodiment, the depth of the concave portion 25 of the inner core material 2 denotes a depth from the middle position to the deepest portion in the thickness direction (up and down direction) of the inner core material 2, and the height of the convex portion 26 denotes a height from the middle position to the top portion of the inner core material 2 in the thickness direction (up and down direction). The dimension obtained by adding the depth of the concave portion 25 and the height of the convex portion 26 corresponds to the thickness dimension of the inner core material 2.

Next, the production procedure of the heat exchanger of this embodiment will be described.

Figure 5A:
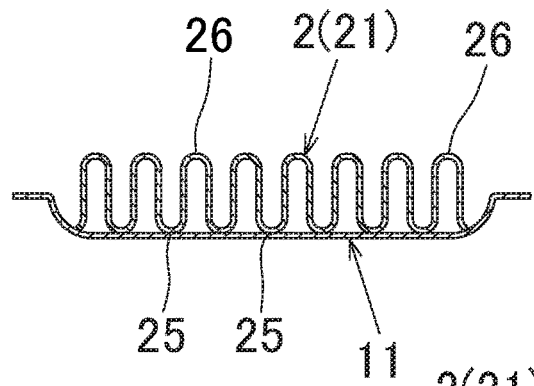
Figure 5B:
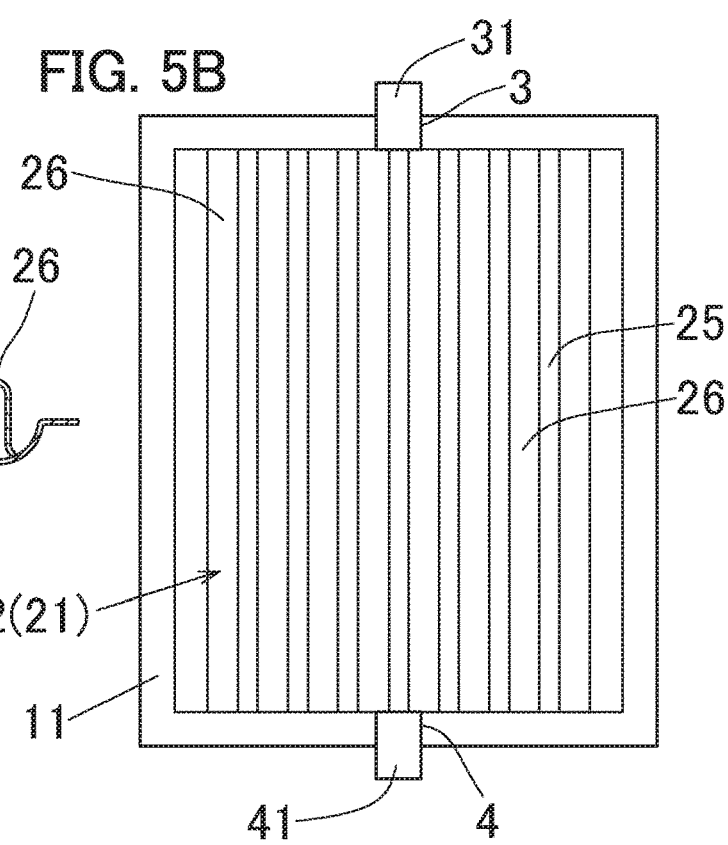

As shown in FIG. 5A, in the middle region of one outer packaging laminate material (the lower outer packaging laminate material) 11 except for the outer peripheral edge portion thereof, an inner core material 2 which is an inner core laminate material 21 in which concave and convex portions 25 and 26 are formed by a corrugating process, embossing, etc., is arranged. Furthermore, joint pipes 31 and 41 are arranged at the front end edge portion and the rear end edge portion of the outer packaging laminate material 11 of the outer peripheral edge portion thereof.

Figure 5C:
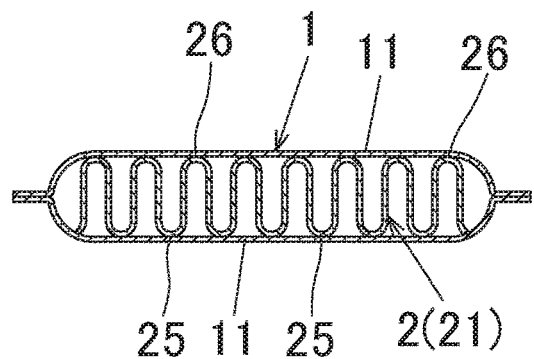
Figure 5D:
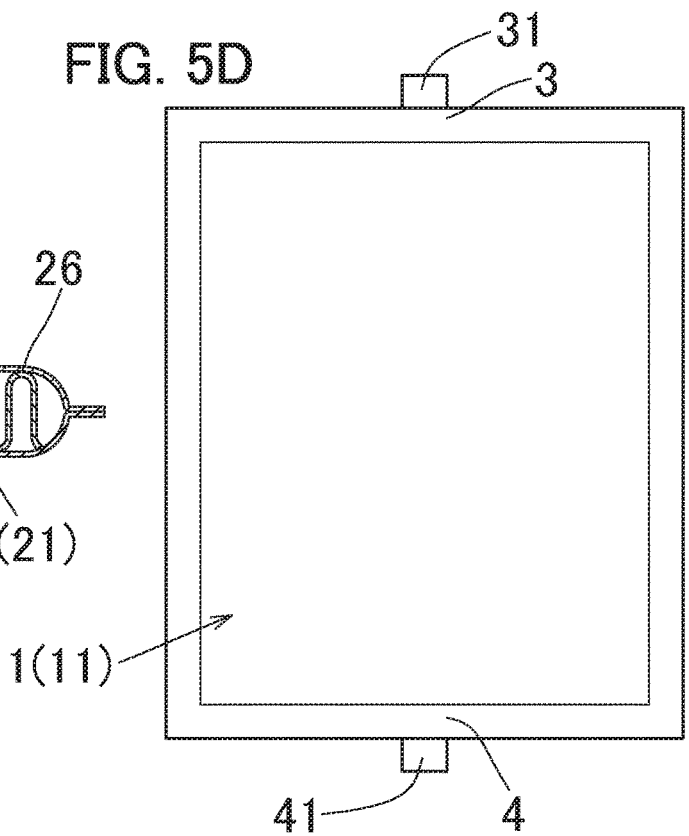

Subsequently, as shown in FIG. 5C and FIG. 5D, the upper outer packaging laminate material 11 is arranged on the lower outer packaging laminate material 11 so as to cover the upper surface of the inner core material 2 and the upper outer periphery of each of the joint pipes 31 and 41. Thus, the thermal fusion layers 13 of the upper and lower outer packaging laminate materials 11 at the outer peripheral edge portion thereof are arranged in a stacked manner.

Figure 5E:
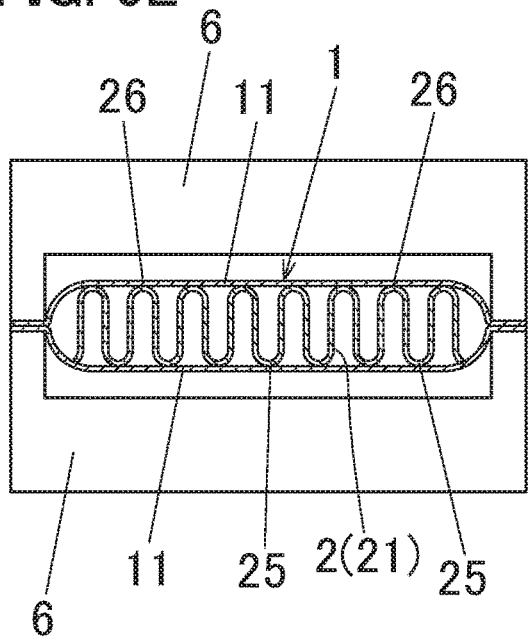
Figure 5F:
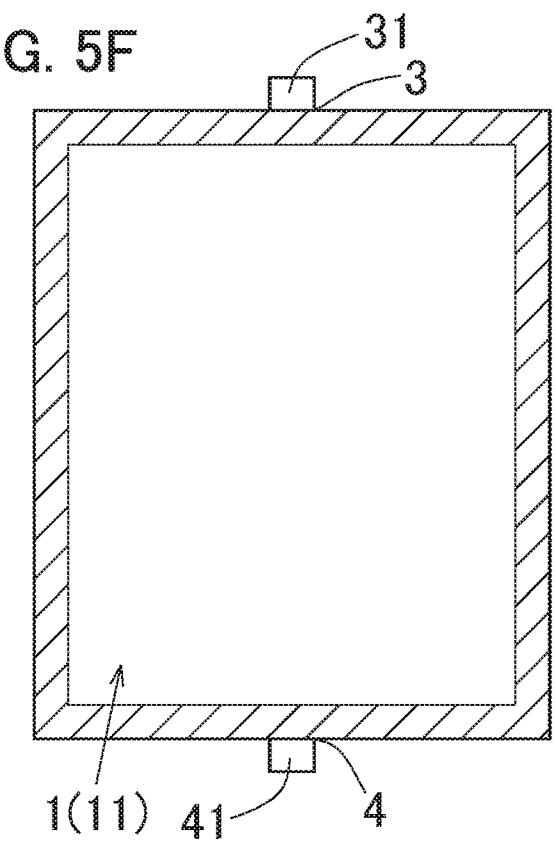

Next, as shown in FIG. 5E, the outer peripheral edge portions of the stacked two outer packaging laminate materials 11 are heated while being sandwiched by a pair of upper and lower heat sealing dies 6. With this, the thermal fusion layers 13 of the outer peripheral edge portions of the upper and lower outer packaging laminate material 11 are integrally joined by thermal fusion (heat sealing). At the same time, the upper side portion outer peripheries and the lower side portion outer peripheries of the joint pipes 31 and 41 are integrally joined by thermal fusion (heat sealing) to the thermal fusion layers 13 of the outer peripheral edge portions of the upper and lower outer packaging laminate materials 11. As described above, the outer peripheral edge portions of the upper and lower outer packaging laminate materials 11 are sealed in a liquid-tight or air-tight state in a state in which a part of each joint pipe 31, 41 is drawn out. In FIG. 5F, in order to facilitate understanding of the present invention, hatching by diagonal lines is applied to the thermally fused region (the same is applied to FIG. 5H).

Subsequently, as shown in FIG. 5E, the intermediate region of the outer packaging material 1 whose outer peripheral edge portion is thermally fused is heated while being sandwiched by a pair of upper and lower heating plates 7. With this, the thermal fusion layer 23 of the bottom surface of the concave portion 25 of the inner core material 2 and the thermal fusion layer 13 of the lower outer packaging laminate material 11 are thermally fused (heat sealed) and integrally joined. At the same time, the thermal fusion layer 23 of the top surface of the convex portion 26 of the inner core material 2 and the thermal fusion layer 13 of the upper outer packaging laminate material 11 are thermally fused (heat sealed) and integrally joined.

Figure 5G:
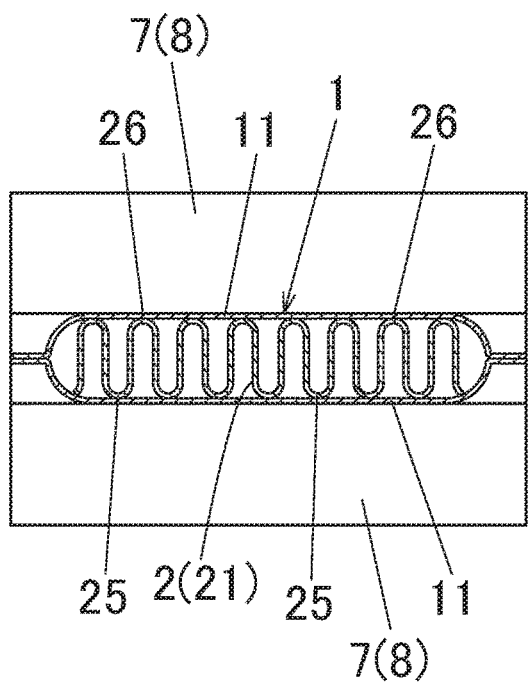
Figure 5H:
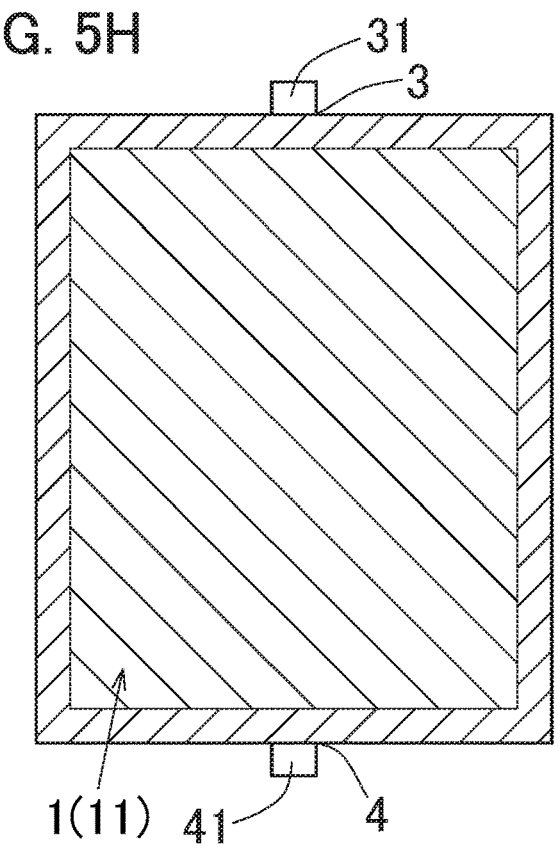

After thermally fusing the concave and convex portions 25 and 26 of the inner core material 2 to the outer packaging material 1, as indicated by the bracketed symbols in FIG. 5G, the outer packaging material 1 is cooled while being sandwiched by a pair of upper and lower cooling plates 8. Thus, the heat exchanger of this embodiment is produced.

Next, a specific example of the heat exchanger produced according to this embodiment will be described.

First, as an outer packaging laminate material 11, a laminate material was prepared, in which a resin film (coating layer 14) made of a PET resin having a thickness of 12 μm was adhered to the upper surface of a 100 μm thick aluminum foil (heat transfer layer 12) with a two-part curing type urethane based adhesive agent and a 40 μm thick LLDPE (linear low density polyethylene) resin film (thermal fusion layer 13) was bonded to the lower surface of the heat transfer layer 12 with a two-part curing type urethane based adhesive agent.

Furthermore, as the inner core laminate material 21, a laminate material was prepared, in which a 40 μm thick LLDPE (linear low density polyethylene) resin film (thermal fusion layer 23) was bonded on both the upper and lower surfaces of a 100 μm thick aluminum foil (heat transfer layer 22) with a tow-part curing type urethane based adhesive agent.

Furthermore, joint pipes 31 and 41 composed of an integrally molded article of polyethylene resin for the refrigerant inlet 3 and the refrigerant outlet 4 were prepared.

Next, a large number of concave and convex portions 25, 26 were formed on the inner core laminate material 21 using embossing rolls.

Furthermore, the outer packaging laminate material 11 and the inner core laminate material 21 were cut into a predetermined size. Thereafter, as described in FIG. 5A to FIG. 5H, the inner core laminate material 21 and the two joint pipes 31 and 41 were sandwiched by two outer packaging laminate materials 11, and the required portions thereof are thermally fused. Thus, a heat exchanger according to the aforementioned embodiment was produced.

Further, a heat exchanger according to the aforementioned embodiment was produced in the same manner as described above except that corrugated concave and convex portions 25 and 26 were formed on the inner core laminate material 21 using corrugating rolls.

Thus, as described above, two types of heat exchangers including a heat exchanger in which the inner core material 2 was embossed and a heat exchanger in which the inner core material 2 was subjected to a corrugating process were produced.

The heat exchanger of the embodiment configured as described above is incorporated in an electronic equipment, such as, e.g., a smartphone and a personal computer, to be used as a cooling device for absorbing heat generated from electronic components, such as, e.g., a CPU of the electronic equipment. That is, a refrigerant, such as, e.g., water and an antifreeze liquid, flows into the outer packaging material 1 from the joint pipe 31 on the refrigerant inlet 3 side, and the refrigerant flows out of the joint pipe 41 on the refrigerant outlet 4 side through the outer packaging material 1. Thus, heat is exchanged between the refrigerant flowing in the outer packaging material 1 and the electronic components arranged around the outer surface of the outer packaging material 1, so that the heat generated from the electronic components is absorbed to cool the electronic components.

According to the heat exchanger of the embodiment configured as described above, it is possible to easily produce the heat exchanger only by appropriately thermally fusing the laminate materials 11 and 21 in which the resin thermal fusion layers 13 and 23 are laminated on the metal heat transfer layers 12 and 22. Therefore, compared with a conventional metal heat exchanger which is produced by highly difficult and troublesome bonding, such as, e.g., brazing, cost reduction and productivity improvement can be achieved.

Furthermore, the laminate materials 11 and 21 as constituent components in the heat exchanger of this embodiment are produced by laminating and bonding resin films as the thermal fusion layers 13 and 23 and the coating layer 14 to metal films as the heat transfer layers 12 and 22. Therefore, it can be produced continuously and efficiently using a well-known laminating method. Unlike the case of using cumbersome and restrictive metal working, such as, e.g., plastic working and cutting, it is possible to further improve the production efficiency and achieve the cost reduction.

Moreover, in this embodiment, the concave and convex portions 25 and 26 are formed on the inner core material 2 using corrugating rolls 5 or embossing rolls. Therefore, a series of steps from the process of producing the inner core laminate material 21 itself for the inner core material to the process of forming the concave and convex portions 25 and 26 can be performed continuously by roll-to-roll, which can more assuredly achieve the improvement of the production efficiency and the cost reduction.

Further, since the heat exchanger of this embodiment is formed by bonding thin laminated sheets (laminate materials) 11 and 21, sufficient thinning and weight reduction can be assuredly achieved.

Further, according to the heat exchanger of this embodiment, the inner core material 2 is arranged inside the outer packaging material 1 to secure a refrigerant circulation space (flow passage) inside the outer packaging material 1. This can secure high strength against any pressure of an internal pressure and an external pressure, and the operation reliability can be improved.

In particular, in this embodiment, the shape and size of the concave and convex portions 25 and 26 of the inner core material 2 can be easily changed. Therefore, by changing the shape and size, the pressure resistance can be freely adjusted, and the size (circulation amount) of the flow passage cross-section of the refrigerant can be freely adjusted. Therefore, the heat exchange performance can be easily improved by, for example, increasing the refrigerant flow amount.

Further, the heat exchanger of this embodiment is formed by the outer packaging material 1 and the inner core material 2 which are laminate materials 11, 21. Therefore, the shape and size of the heat exchanger itself can be easily changed, and as described above, the thickness, the strength, the heat exchange performance, etc., can also be easily changed. For these reasons, it can be easily configured to have an appropriate configuration in accordance with the heat exchanger mounting position, etc., which can increase the degree of freedom in design and also improve the versatility.

Moreover, in this embodiment, in cases where the thermal fusion layer 13 of the outer packaging material 1 and the thermal fusion layer 23 of the inner core material 2 to be thermally fused thereto are made of the same resin, the outer packaging material 1 and the inner core material 2 can be integrally joined together more assuredly, which in turn can further improve the strength against the internal pressure and further improve the operation reliability.

Moreover, in this embodiment, in cases where the thermal fusion layer 13 of the outer packaging material 1 and the joint pipes 31 and 41 of the refrigerant inlet 3 and the refrigerant outlet 4 to be attached to the outer packaging material 1 in a penetrating state are made of the same kind of resin, the outer peripheral surfaces of the joint pipes 31 and 41 can be more assuredly integrally joined to the inner peripheral surface of the outer packaging material 1. As a result, the joint pipes 31 and 41 can be mounted in a hermetically sealed or liquid tight sealed state by the outer packaging material 1, and liquid leakage and the like can be assuredly prevented, resulting in higher operation reliability.

In the above-described embodiment, the description was made by exemplifying the heat exchanger used as a cooler (cooling device) by circulating a heat transfer medium (refrigerant) for cooling, but the present invention is not limited thereto. In the present invention, the heat exchanger can be used as a heater (heating device) or a heat generator (heat generating device) by circulating a heating medium (heat medium) for heating inside thereof.

In the above-described embodiment, the description was made by exemplifying the case in which the outer packaging material 1 was formed by stacking two outer packaging laminate materials 1 one on the other and heat sealing the outer peripheral edge portion thereof. In the present invention, it is also possible to form the outer packaging material 1 by one outer packaging laminate material 11. For example, a bag-like outer packaging material may be formed by folding one outer packaging laminate material 11 in half and heat sealing the other three sides except for the bent side.

Furthermore, in the present invention, the outer packaging material 1 may be previously processed to accommodate the inner core material 2 by deep drawing or the like.

Moreover, in the above-described embodiment, the description was made by exemplifying the case in which the coating layer was provided as an outer packaging material on the outer surface side (the other surface side) of the heat transfer layer, but the present invention is not limited thereto. In the present invention, as the outer packaging material, an outer packaging material having no coating layer on the outer surface side of the heat transfer layer may be used.

Furthermore, for the outer packaging material and the inner core material of the above-described embodiment, the description was made by exemplifying the case in which the thermal fusion layer is laminated on the heat transfer layer, but the present invention is not limited thereto. In the present invention, another layer (intermediate layer) may be laminated between the heat transfer layer and the thermal fusion layer.

Furthermore, in the above-described embodiment, the outer packaging material 1 and the inner core material 2 are each formed of a laminate material having a three-layer structure, but the present invention is not limited thereto. In the present invention, the outer packaging material 1 may be composed of two or four or more layers of laminate materials, and the inner core material 2 may be composed of four or more layers of laminate materials.

Further, in the above-described embodiment, the description was made by exemplifying the case in which the refrigerant inlet 3 and the refrigerant outlet 4 are formed at the front end portion and the rear end portion, respectively. However, the formation positions of the heat medium inlet (refrigerant inlet) and the heat medium outlet (refrigerant outlet) are not limited, and they may be formed at any positions.

The present invention also includes the case in which only concave portions or only convex portions are formed on the inner core material 2. For example, in the inner core material in which only concave portions are formed, the flat portion is also served as a convex portion. In the inner core material in which only convex portions are formed, the flat portion is also served as a concave portion.

The present application claims priority to Japanese Patent Application No. 2018-122661 filed on Jun. 28, 2018, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The heat exchanger of the present invention can be used as a cooler (cooling device) for measures against heat generation around a CPU or a battery of smartphones or personal computers, measures against heat generation around displays of a liquid crystal display TV, an organic EL TV, or a plasma TV, and measures against heat generation around a power module or a battery of an automobile. In addition to the above, the heat exchanger of the present invention can also be utilized as a heater (heating device) used for floor heating and snow removal.

DESCRIPTION OF REFERENCE SYMBOLS

1: outer packaging material
11: outer packaging laminate material
12: heat transfer layer
13: thermal fusion layer
2: inner core material
21: inner core laminate material
22: heat transfer layer
23: thermal fusion layer
25: concave portion
26: convex portion
3: refrigerant inlet
31: joint pipe
4: refrigerant outlet
41: joint pipe
5: corrugating roll

The invention claimed is:

1. A heat exchanger comprising:
at least one outer packaging material wherein
the at least one outer packaging material includes a first outer packaging material and a second outer packaging material that are provided with a heat medium inlet and a heat medium outlet, wherein a heat medium flows into an inner space of the outer packaging materials via the heat medium inlet, flows through the inner space, and flows out of the outer packaging materials via the heat medium outlet; and
an inner core material arranged in the inner space of the outer packaging materials,
wherein each of the outer packaging materials is constituted by an outer packaging laminate material including a heat transfer layer, a resin thermal fusion layer provided on an inner surface side of each heat transfer layer, and a resin coating layer provided on an outer surface side of each heat transfer layer and the resin thermal fusion layers of the outer packaging laminate materials are integrally joined to each other along a peripheral edge portion of the outer packaging laminate materials,
wherein each resin coating layer has a melting point higher than that of the resin thermal fusion layer of the outer packaging laminate material in each of the outer packaging materials by 10° Celsius or more;
wherein the thermal fusion layer of the outer packaging material and the thermal fusion layer of the inner core material are made of the same polyolefin-based resin;
wherein the inner core material is constituted by an inner core laminate material formed in a corrugated plate shape including a heat transfer layer and resin thermal fusion layers provided on each surface side of the heat transfer layer, and includes concave and convex portions,
wherein the heat transfer layer of the outer packaging laminate material of each of the outer packaging materials and the heat transfer layer of the inner core laminate material are comprised of aluminum foil and wherein a chemical conversion coating film is formed on each surface of the aluminum foil of the heat transfer layer of the outer packaging laminate material of each of the outer packaging materials and the aluminum foil of the heat transfer layer of the inner core laminate material;

wherein the resin thermal fusion layers of a concave portion bottom and a convex portion top of the inner core material and the resin thermal fusion layers of the outer packaging materials are integrally joined, wherein the thermal fusion layer at the bottom of the concave portion of the inner core material and the thermal fusion layer of the outer packaging material are thermally fused and polyolefin-based resin layers are interposed entirely between the heat transfer layer of the inner core material and the heat transfer layer of the outer packaging material, and wherein the thermal fusion layer at the top of the convex portion of the inner core material and the thermal fusion layer of the outer packaging material are thermally fused and polyolefin-based resin layers are interposed entirely between the heat transfer layer of the inner core material and the heat transfer layer of the outer packaging material.

2. The heat exchanger as recited in claim 1, wherein a depth of the concave portion or a height of the convex portion is set to 0.1 mm to 50 mm.

3. The heat exchanger as recited in claim 1, further comprising joint pipes,
wherein one of the joint pipes is provided at the heat medium inlet and the other of the joint pipes is provided at the heat medium outlet, and the joint pipes are configured to allow the heat medium to flow into and flow out of the outer packaging materials via the joint pipes.

4. A method of producing the heat exchanger as recited in claim 1,
wherein the concave and convex portions of the inner core material are formed by an embossing process or a corrugating process.

5. The method of producing the heat exchanger as recited in claim 4,
wherein the concave and convex portions are formed on the inner core material by passing the inner core laminate material between a pair of embossing rolls or a pair of corrugating rolls while sandwiching the inner core laminate material between the pair of embossing rolls or the pair of corrugating rolls.

6. A method of producing the heat exchanger as recited in claim 1,
wherein the concave and convex portions of the inner core material are formed by a pleating process.

7. The heat exchanger as recited in claim 1, wherein each chemical conversion coating film comprises a phosphoric acid, a chromic acid, and at least one compound selected from the group consisting of a metal salt of a fluoride and a non-metal salt of a fluoride.

8. The heat exchanger as recited in claim 1, wherein each resin coating layer is comprised of an insulating resin.

9. The heat exchanger as recited in claim 1, wherein each resin coating layer is comprised of a conductive resin.

10. The heat exchanger as recited in claim 1, wherein the resin thermal fusion layers of a concave portion bottom and a convex portion top of the inner core material and the resin thermal fusion layers of the outer packaging materials are integrally joined by bonding the resin thermal fusion layers.

11. The heat exchanger as recited in claim 10, wherein the resin thermal fusion layers are bonded using an adhesive agent.

* * * * *